(12) United States Patent
Rainer et al.

(10) Patent No.: US 11,532,986 B2
(45) Date of Patent: Dec. 20, 2022

(54) MULTI-STAGE POWER CONVERTER WITH TRANSFORMLESS SWITCHED-CAPACITOR CONVERTER AND CONTROL

(71) Applicant: Infineon Technologies Austria AG, Villach (AT)

(72) Inventors: Christian Rainer, Magdalensberg (AT); Matthias J. Kasper, Villach (AT)

(73) Assignee: Infineon Technologies Austria AG, Villach (AT)

(*) Notice: Subject to any disclaimer, the term of this patent is extended or adjusted under 35 U.S.C. 154(b) by 0 days.

(21) Appl. No.: 17/070,273

(22) Filed: Oct. 14, 2020

(65) Prior Publication Data
US 2022/0115953 A1   Apr. 14, 2022

(51) Int. Cl.
*H02M 3/158*   (2006.01)

(52) U.S. Cl.
CPC ........ *H02M 3/1584* (2013.01); *H02M 3/1586* (2021.05)

(58) Field of Classification Search
None
See application file for complete search history.

(56) References Cited

U.S. PATENT DOCUMENTS

| | | | |
|---|---|---|---|
| 6,710,646 B1 | 3/2004 | Kimball | |
| 7,274,547 B2* | 9/2007 | Al-Khayat | H02P 9/006 307/98 |
| 7,812,579 B2* | 10/2010 | Williams | H02M 3/1588 323/266 |
| 7,973,494 B2* | 7/2011 | Yao | H02M 3/1582 315/291 |
| 9,209,697 B2* | 12/2015 | Uno | H02M 1/4225 |
| 10,199,945 B2* | 2/2019 | Nozawa | B60L 50/64 |
| 10,211,747 B2* | 2/2019 | Agamy | H02M 3/3376 |
| 10,483,862 B1* | 11/2019 | Cook | H02M 1/44 |
| 10,547,241 B1 | 1/2020 | Li et al. | |
| 2011/0154068 A1 | 6/2011 | Huang et al. | |

(Continued)

FOREIGN PATENT DOCUMENTS

| | | |
|---|---|---|
| CN | 208862745 U | 5/2019 |
| JP | H1042576 A | 2/1998 |

OTHER PUBLICATIONS

European Search Report, EP 21 20 1379, dated Feb. 17, 2022, pp. 1-9.

(Continued)

*Primary Examiner* — Jeffrey A Gblende
(74) *Attorney, Agent, or Firm* — Armis IP Law, LLC

(57) ABSTRACT

This disclosure includes novel ways of implementing a power supply that powers a load. More specifically, a power supply includes a controller. The controller controls operation of a first power converter stage and a second power converter stage to convert an input voltage into an output voltage. For example, the first power converter stage is operative to receive an input voltage and convert the input voltage into an intermediate voltage. The second power converter stage such as a transformer-less switched-capacitor converter is coupled to the first power converter stage. The second power converter stage receives the intermediate voltage and converts the intermediate voltage into an output voltage to power a load.

35 Claims, 11 Drawing Sheets

(56) References Cited

U.S. PATENT DOCUMENTS

2013/0154600 A1   6/2013   Giuliano

OTHER PUBLICATIONS

Ye Zichao, et al, "A 48-to-12 V Cascaded Resonant Switched-Capacitor Converter for Data Centers with 99% Peak Efficiency and 2500 W/in3 Power Density", 2019 IEEE Applied Power Electronics Conference and Exposition (APEC), IEEE, Mar. 17, 2019, pp. 13-18, XP033555938.

* cited by examiner

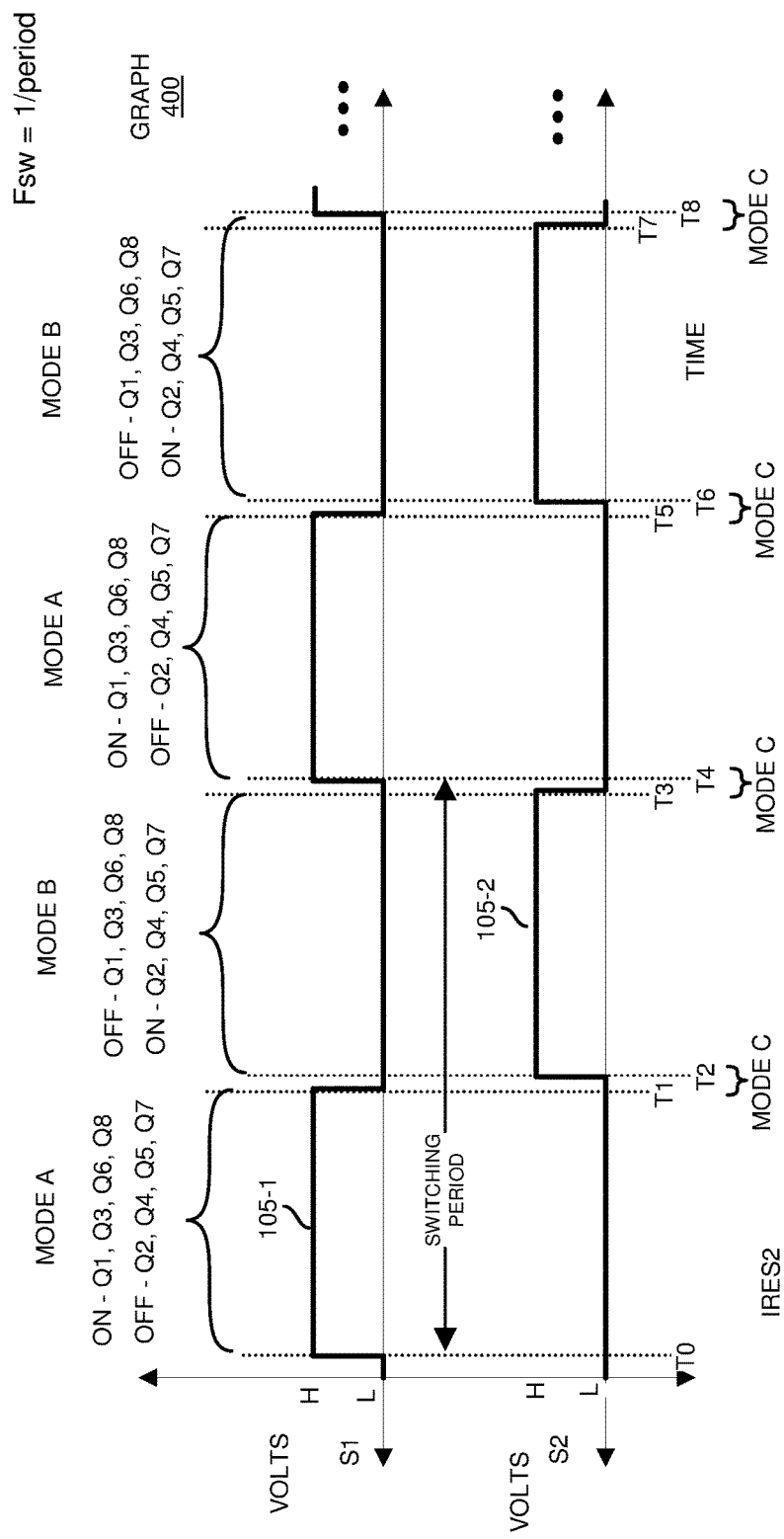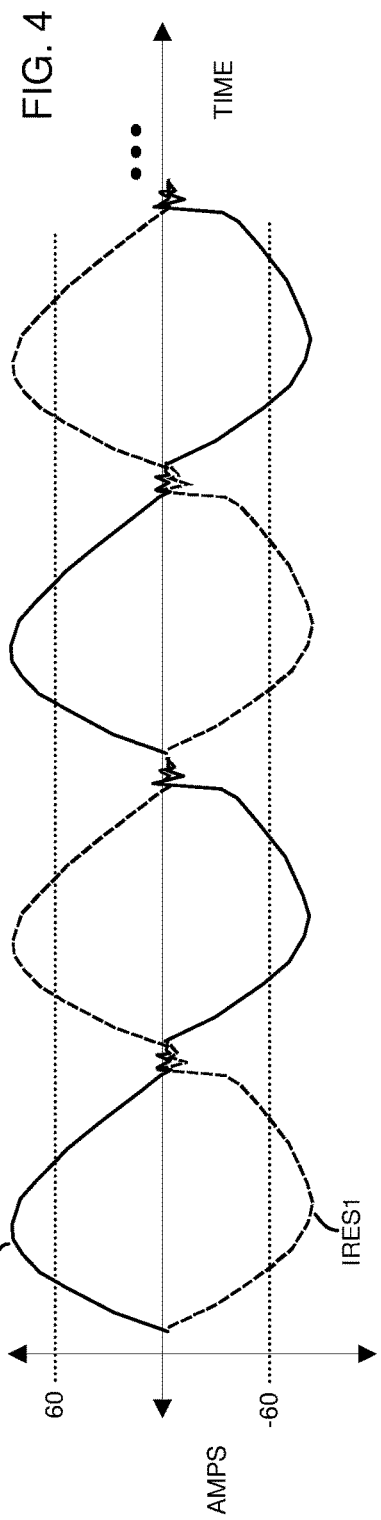
FIG. 4

MULTI-STAGE POWER CONVERTER WITH TRANSFORMLESS SWITCHED-CAPACITOR CONVERTER AND CONTROL

BACKGROUND

There are multiple types of switching power converters. For example, one type of conventional switching power converter is a buck converter. In general, to maintain an output voltage within a desired range, a controller associated with the buck converter compares the magnitude of a generated output voltage to a setpoint reference voltage. Based on a respective error voltage, the controller modifies a respective switching frequency and/or pulse width modulation associated with activating high side switch circuitry or low side switch circuitry in the buck converter.

Another type of power converter is a so-called switched-capacitor converter. In general, a switched capacitor voltage converter performs energy transfer and voltage conversion using capacitors.

Next generation communication services will include base stations having increased power demands. A typical set-up may include an AC-DC converter at the base of a telemetry tower from which a −48V bus is routed to the antenna at the top of the tower. There, the bus voltage will need to be converted to a different voltage value. Since the bus voltage may vary between the different vendors and also due to voltage drops in the cable, the input voltage of this converter may vary such as between −35V to −75V with short spikes up to −100V.

BRIEF DESCRIPTION

Implementation of clean energy (or green technology) is very important to reduce our impact as humans on the environment. In general, clean energy includes any evolving methods and materials to reduce an overall toxicity on the environment from energy consumption.

This disclosure includes the observation that raw energy, such as received from green energy sources or non-green energy sources, typically needs to be converted into an appropriate form (such as desired AC voltage, DC voltage, etc.) before it can be used to power end devices such as servers, computers, mobile communication devices, wireless base stations, etc. Regardless of whether energy is received from green energy sources or non-green energy sources, it is desirable to make most efficient use of raw energy provided by such systems to reduce our impact on the environment. This disclosure contributes to reducing our carbon footprint and better use of energy via more efficient energy conversion.

Embodiments herein include novel ways of implementing a power supply that powers a load. More specifically, embodiments herein include an apparatus and/or system including a controller. The controller controls operation of a first power converter stage and a second power converter stage to convert an input voltage into an output voltage. For example, in one embodiment, the first power converter stage is operative to receive an input voltage and convert the input voltage into an intermediate voltage. The second power converter stage such implementing as a transformer-less switched-capacitor converter is coupled to the first power converter stage. The second power converter stage receives the intermediate voltage and converts the intermediate voltage into an output voltage to power a load.

In one embodiment, the intermediate voltage produced by the first power converter stage is a negative voltage. The second power converter stage is a voltage inverter operative to convert the intermediate voltage into the output voltage, the output voltage being a positive voltage. Accordingly, embodiments herein include receiving an input voltage (of negative polarity) at a first power converter stage and converting it into an intermediate voltage of negative polarity from the first power converter stage. The second power converter stage converts the negative intermediate voltage into a positive output voltage. In still further example embodiments, a magnitude of the output voltage is substantially equal to a magnitude of the intermediate voltage. In such an instance, the second power converter stage is an inverter.

Further embodiments herein include a controller. The controller is operative to: i) receive an output voltage feedback signal derived from the output voltage, and ii) regulate generation of the intermediate voltage and/or output voltage based on a magnitude of the output voltage feedback signal.

In accordance with further example embodiments, the second power converter stage is operative to provide unregulated conversion of the intermediate voltage into the output voltage.

Further embodiments herein include a controller operative to: i) receive an intermediate voltage feedback signal derived from the intermediate voltage, and ii) regulate generation of the intermediate voltage based on the intermediate voltage feedback signal.

In still further example embodiments, the controller is operative to: i) vary a switching frequency of operating switches in the first power converter stage (such as a buck converter or other suitable entity) to convert the input voltage into the intermediate voltage, and ii) set a switching frequency of the second power converter stage to a predetermined switching frequency value. In one embodiment, the switching frequency of the second power converter stage is set to a resonant frequency associated with a switched-capacitor converter in the second power converter stage.

The second power converter stage can be configured in any suitable manner. For example, in one embodiment, the second power converter stage includes: i) a first resonant capacitor and a second resonant capacitor; and ii) an inductor coupling the first resonant capacitor and the second resonant capacitor, the inductor supporting zero voltage switching of switches in the second power converter stage to convert the intermediate voltage into the output voltage.

In further example embodiments, the second power converter stage includes: a first capacitor, multiple switches, a second capacitor, an input voltage node that receives the intermediate voltage, and an output voltage node that outputs the output voltage.

By way of non-limiting example embodiment, the multiple switches includes: a first pair of switches operative to switch between connecting a first node of the first capacitor between the output node and a ground reference voltage; a second pair of switches operative to switch between connecting a second node of the first capacitor between the ground reference voltage and the input voltage node; a third pair of switches operative to switch between connecting a first node of the second capacitor between the output node and the ground reference voltage; and a fourth pair of switches operative to switch between connecting a second node of the second capacitor between the output node and the ground reference voltage.

In still further example embodiments, the second power converter stage includes a circuit path extending between the first node of the first capacitor and the first node of the second capacitor. The inductor supports zero voltage switching of the switches in the second power converter stage to convert the intermediate voltage into the output voltage. The second power converter stage includes a third capacitor. In one embodiment, the third capacitor is a DC bias blocking capacitor such as in series with a zero voltage switching inductor. Thus, the third capacitor is disposed at any suitable location such as in series with the inductor between the first node of the first capacitor and the first node of the second capacitor.

In still further example embodiments, the first pair of switches and the second pair switches are disposed in series between the output voltage node and the input voltage node. The third pair of switches and the fourth pair switches are disposed in series between the output voltage node and the input voltage node.

Embodiments herein include one or more of the following features:
Transformer-less voltage regulation and inversion capability at highest power density and efficiency
Lower voltage ratings of the semiconductor devices (switches) compared to a standard inverting buck-boost converters, which allows leveraging of the superior FOM of these devices for high frequency operation
High and flat efficiency curve over the load range
Simple control concept by regulating the output voltage with the buck stage with standard CCM (Continuous Conduction Mode) fixed frequency operation and an unregulated ZSC (Zero Switching Current) stage for voltage inversion
Easy start-up with the buck stage without requiring any additional e-fuse, etc.

These and other more specific embodiments are disclosed in more detail below.

Note that although embodiments as discussed herein are applicable to power converters, the concepts disclosed herein may be advantageously applied to any other suitable topologies as well as general power supply control applications.

Note that any of the resources as discussed herein can include one or more computerized devices, controller, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to methods, systems, computer program products, etc., that support operations as discussed herein.

One embodiment herein includes a computer readable storage medium and/or system having instructions stored thereon. The instructions, when executed by computer processor hardware, cause the computer processor hardware (such as one or more co-located or disparately located processor devices) to: convert a received input voltage into an intermediate voltage; and via a transformer-less second power converter stage coupled to the first power converter stage, convert the intermediate voltage into an output voltage to power a load.

The ordering of the steps above has been added for clarity sake. Note that any of the processing operations as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of implementing one or more inductor components to deliver current to a load. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 4 is an example timing diagram illustrating phase control and resonant current according to embodiments herein.

Figure 1:
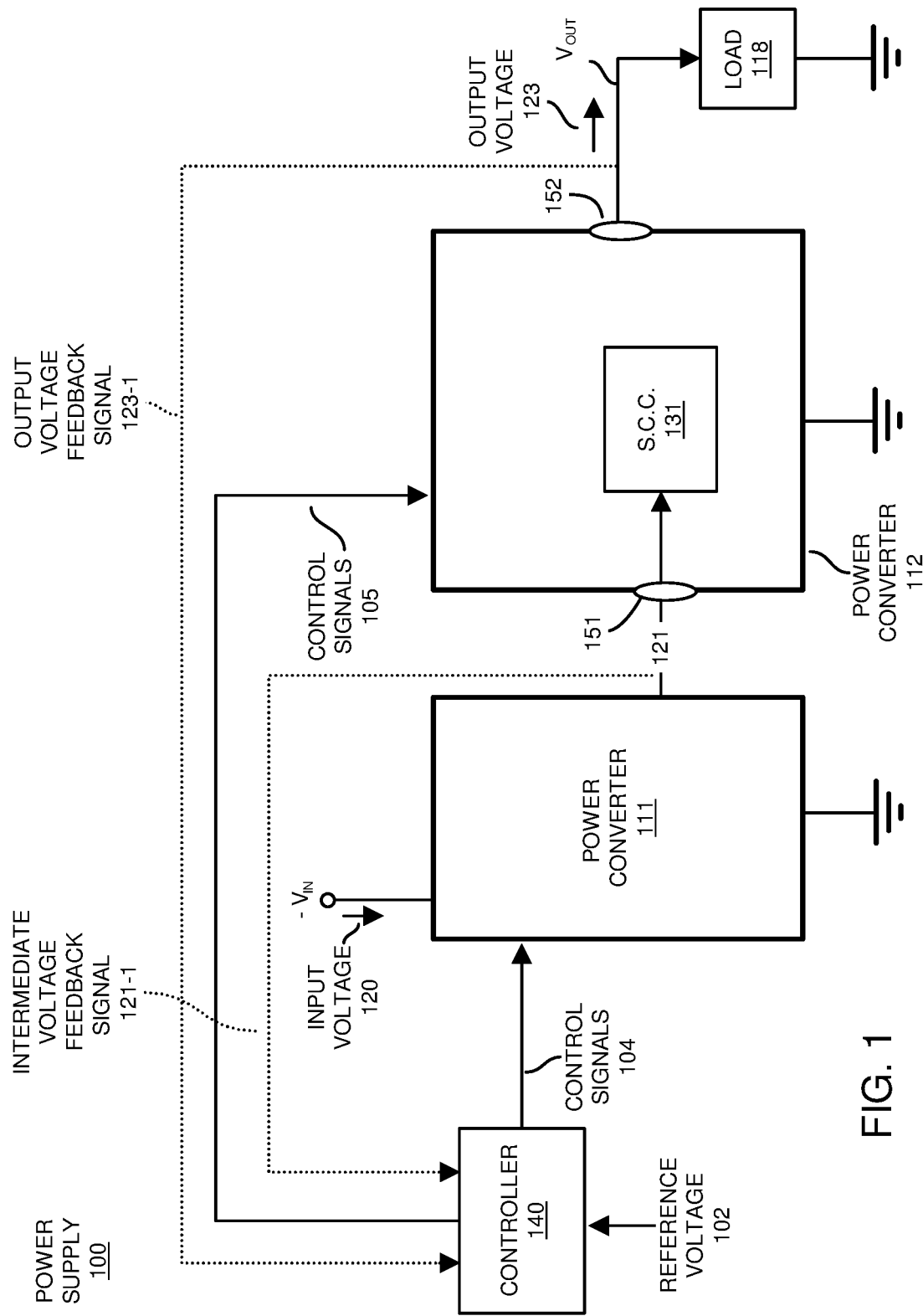
FIG. 1 is an example general diagram of a power system (power supply) including multiple power converters according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Embodiments herein include novel ways of implementing a power supply that powers a load. More specifically, embodiments herein include an apparatus and/or system including a controller. The controller controls operation of a first power converter stage and a second power converter stage to convert an input voltage into an output voltage. For example, in one embodiment, the first power converter stage is operative to receive an input voltage and convert the input voltage into an intermediate voltage. The second power converter stage such as a transformer-less switched-capacitor converter is coupled to the first power converter stage. The second power converter stage receives the intermediate voltage and converts the intermediate voltage into an output voltage to power the load.

Now, more specifically, FIG. 1 is an example general diagram of a power system (power supply) including multiple power converters according to embodiments herein.

In this example embodiment, the power supply 100 includes a controller 140, first power converter 111 (i.e., first power converter stage), and second power converter 112 (i.e., second power converter stage).

During operation, the controller 140 controls operation of the first power converter 111 and the second power converter 112 to convert an input voltage 120 (such as negative Vin) into an output voltage 123 (such as a positive output voltage value).

More specifically, in one embodiment, the first power converter 111 receives input voltage 120 and converts the input voltage 120 into an intermediate voltage 121. The second power converter 112 such as a transformer-less switched-capacitor converter 131 is coupled to the first power converter 111. The second power converter 112 receives the intermediate voltage 121 and converts the intermediate voltage 121 into an output voltage 123 to power the load 118.

In one embodiment, the intermediate voltage 121 produced by the first power converter 111 is a negative voltage value. In one embodiment, the second power converter 112 is a voltage inverter operative to convert the intermediate voltage 121 (such as a DC voltage) into the output voltage 123. Via inversion supplied by the switched-capacitor converter 131, such as switching from −V to +V, the power converter 112 produces the output voltage 123 to be a positive voltage value (such as a DC voltage). In such an instance, embodiments herein include converting an input voltage 120 (of negative polarity) and converting it into an output voltage 123 of positive polarity.

In still further example embodiments, a magnitude of the output voltage 123 is substantially equal (such as within 10%) to a magnitude of the intermediate voltage 121.

As previously discussed, the power supply 100 includes controller 140. The controller 140: i) receives an output voltage feedback signal 123-1 derived from the output voltage 123, and ii) regulates generation of the intermediate voltage based on a magnitude of the output voltage feedback signal. In one embodiment, the output voltage feedback signal 123-1 is equal to the output voltage 123. Alternatively, a magnitude of the output voltage feedback signal 123-1 is a fraction of the magnitude of the output voltage 123.

As further shown, the controller 140 compares the output voltage feedback signal 123-1 to a reference voltage 103. Based on the comparison, the controller 140 produces control signals 104 to control operation (regulation) of the first power converter 111 and conversion of the input voltage 120 into the respective intermediate voltage 121.

Further embodiments herein include, in addition to or as an alternative to regulating based on the output voltage feedback signal 123-1 as previously discussed, a controller 140 operative to: i) receive an intermediate voltage feedback signal 121-1 derived from the intermediate voltage 121, and ii) regulate generation of the intermediate voltage 121 based on the intermediate voltage feedback signal 121-1.

In still further example embodiments, the controller 140 receives feedback indicating a magnitude of the currents associated with intermediate voltage 121 and/or the output voltage 123. The controller 140 can be configured to use none, one, or both of the detected currents outputted from the first power converter 111 and/or the second power converter 112 to generate respective control signals 104 and/or 105.

In addition to producing control signals 104, the controller 140 (or other suitable entity) produces control signals 105 supplied to the switched-capacitor converter 131. As further discussed herein, the second power converter 112 (and corresponding one or more switched-capacitor converter 131) provides unregulated conversion of the intermediate voltage into the output voltage 123.

Note that embodiments herein are useful over conventional techniques. For example, in contrast to conventional techniques, and as further discussed herein, the novel power supply as described herein provides high efficiency of converting an input voltage to a respective output voltage via unique first stage regulation (such as via power converter 111) and second stage voltage conversion provided by the transformer-less switched-capacitor converter 131.

Figure 2:
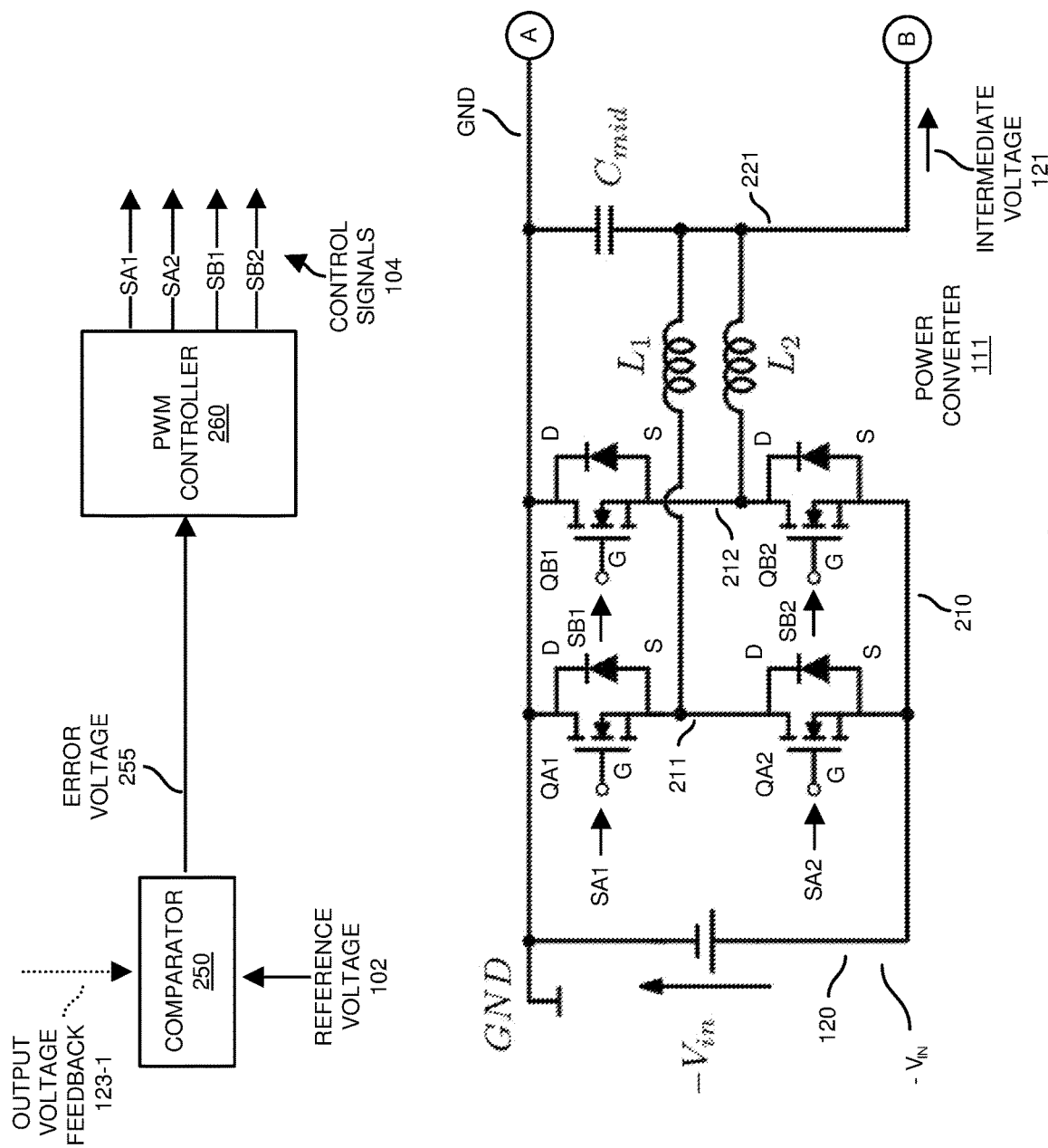
FIG. 2 is an example diagram illustrating a first power converter stage according to embodiments herein.

FIG. 2 is an example diagram illustrating a first power converter stage according to embodiments herein.

In this non-limiting example embodiment, the power converter 111 is configured to include one or more buck converters (or other suitable power converter entities) operating in parallel.

For example, the first buck converter of power converter 111 in this embodiment includes switch QA1, switch QA2, and inductor L1. The second buck converter in the power converter 111 includes switch QB1, switch QB2, and inductor L2.

As further shown, the switch QA1 is connected in between the ground reference and the node 210 receiving the input voltage 120. For example, as further shown, the drain of switch QA1 is connected to the ground reference. The source node of switch QA1 is connected to the drain node of switch QA2 as well as the input of the inductor L1 at node 211. The output of the inductor L1 is connected to the node 221.

The switch QB1 is connected in between the ground reference and the node 210 receiving the input voltage 120. For example, as further shown, the drain of switch QB1 is connected to the ground reference. The source node of switch QB1 is connected to the drain node of switch QB2 as well as the input of the inductor L2 at node 212. The output of the inductor L2 is connected to the node 221.

Capacitor Cmid stores the output voltage 123.

In this general manner, any number of buck converters can be connected in parallel to produce the output voltage 123.

Note again that although the power converter 111 in FIG. 2 is illustrated as a buck converter configuration, the power converter 111 can be instantiated as any suitable type of voltage converter providing regulation as described herein.

In accordance with further example embodiments, during operation, the controller 140 produces control signals 104 (such as SA1, SA2, SA3, and SA4) to control respective switches QA1, QA2, QB1, and QB2 based on the error voltage 255 derived from comparing the output voltage feedback signal 123-1 to the reference voltage 102.

Control signal SA1 controls switch QA1; control signal SA2 controls switch QA2; control signal SB1 controls switch QB1; control signal SB2 controls switch QB2.

Via switching of the switches QA1 and QA2 based on control signals SA1 and SA2, node 211 coupling the source node of switch QA1 and the drain node of switch QA2 provides current through the inductor L1, resulting in generation of the intermediate voltage 121.

Via switching of the switches QB1 and QB2 based on control signals SA3 and SA4, node 212 coupling the source node of switch QB1 and the drain node of switch QB2 provides current through the inductor L2, resulting in generation of the intermediate voltage 121.

In one embodiment, the controller 140 controls switching of the switches QA1 and QA2 based on one or more feedback parameters in a manner as previously discussed. For example, as previously discussed, the controller 140 can be configured to receive output voltage feedback signal 123-1 derived from the output voltage 123 supplied to power the load 118 as previously discussed in FIG. 1.

Referring again to FIG. 2, in one embodiment, via the comparator 250, the controller 140 compares the output voltage feedback signal 123-1 (such as output voltage 123 itself or derivative signal) to the reference voltage 102. As previously discussed, the reference voltage 102 is or corresponds to a desired setpoint in which to control a magnitude of the output voltage 123.

Based on the comparison as provided by comparator 240, the comparator 240 produces a respective error voltage 255 indicating the difference between the output voltage feedback signal 123-1 and the reference voltage 102. A magnitude of the error voltage varies depending upon the degree to which the magnitude of the output voltage 123 is in or out of regulation (with respect to a reference voltage 102).

As further shown, the PWM controller 260 of the controller 140 controls operation of switching the switches QA1, QA2, QB1, and QB2 based upon the magnitude of the error voltage 255. For example, if the error voltage 255 indicates that the output voltage 123 (of the power converter 112) is less than a magnitude of the reference voltage 102, the PWM controller 260 increases a duty cycle of activating the high side switch QA1 (thus decreasing a duty cycle of activating the low-side switch QA2) in a respective switching control cycle.

Conversely, if the error voltage 255 indicates that the output voltage 123 (of the power converter 111) is greater than a magnitude of the reference voltage 102, the PWM controller 260 decreases a duty cycle of activating the high side switch QA1 (thus increasing a duty cycle of activating the low-side switch QA2) in a respective switching control cycle.

The controller 140 controls the second phase of the power converter 111 in a similar manner based on comparison of the output voltage feedback signal 123-1 or intermediate voltage 121 with respect to the reference signal 102.

In one embodiment, via variations in the pulse with modulation and/or switching frequency of controlling the respective switches QA1, QA2, QB1, and QB2, the controller 141 controls generation of the intermediate voltage 121 and the output voltage 123 such that the output voltage 123 remains within a desired voltage range.

In still further example embodiments, the controller 140 is configured to, in a frequency modulation mode, vary a switching frequency of operating switches QA1, QA2, QB1, and QB2 in the first power converter 111 (such as a buck converter or other suitable entity) to convert the input voltage 120 into the intermediate voltage 121.

In a similar manner, the controller 140 and corresponding circuitry can be configured to control regulation of the respective power converter 111 based on the comparison of the intermediate voltage feedback signal 121-1 to the reference voltage 102.

As further discussed below in FIG. 3, the controller 140 (or other suitable entity) sets a switching frequency of the second power converter 112 (switched-capacitor converter 131) to a predetermined switching frequency value that is efficient to convert the intermediate voltage 121 into the output voltage 123. In one embodiment, the controller 140 sets the switching frequency of the switched-capacitor converter 131 to a value of the resonant frequency associated with the switched-capacitor converter 131.

Figure 3:
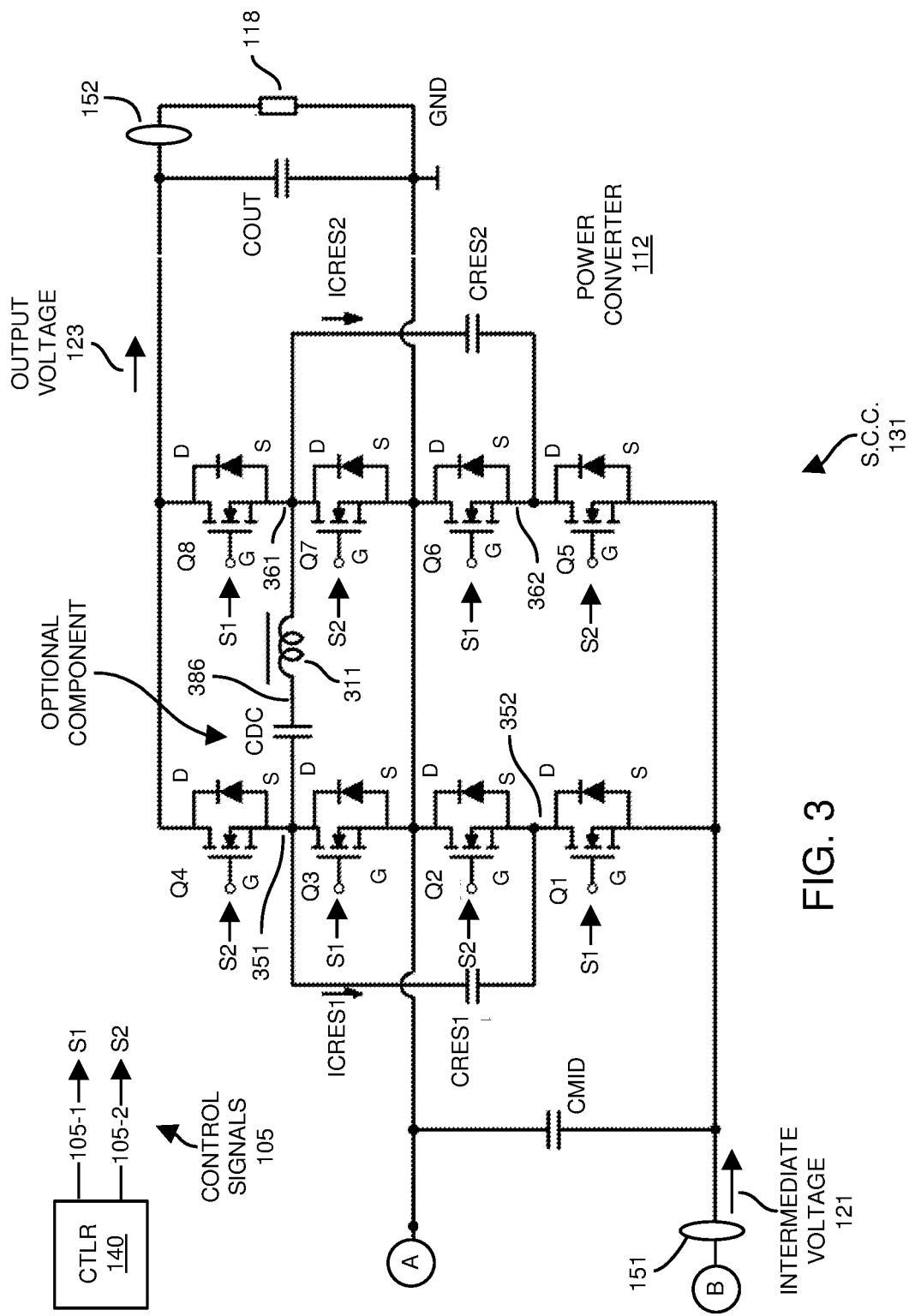
FIG. 3 is an example timing diagram illustrating a second power converter stage according to embodiments herein.

FIG. 3 is an example diagram illustrating a second power converter stage according to embodiments herein.

In this example embodiment, the switched-capacitor converter 131 of the power converter 112 includes switches Q1, Q2, Q3, Q4, Q5, Q6, Q7, and Q8. Additionally, the switched-capacitor converter 131 includes inductor 311 (such as Lzvs) as well as capacitors CRES1, CRES2, Cin, Cout, and CDC (capacitor CDC is an optional component).

As previously discussed, the input voltage node 151 of the power converter 112 receives intermediate voltage 121. As further shown, capacitor Cin is connected between the input voltage node 151 and ground.

The switches Q1, Q2, Q3, and Q4, are connected in series between the output voltage node 152 and the input voltage node 151. For example, the drain node of switch Q4 is connected to the output voltage node 152; the source node of switch Q4 is connected to the drain node of switch Q3 at node 351; the source node of switch Q3 is connected to the drain node of switch Q2 at the ground reference voltage; the source node of switch Q2 is connected to the drain node of switch Q1 at node 352; the source node of switch Q1 is connected to the input voltage node 151.

The switches Q5, Q6, Q7, and Q8, are connected in series between the output voltage node 152 and the input voltage node 151. For example, the drain node of switch Q8 is connected to the output voltage node 152; the source node of switch Q8 is connected to the drain node of switch Q7 at node 361; the source node of switch Q7 is connected to the drain node of switch Q6 at ground; the source node of switch Q6 is connected to the drain node of switch Q5 at node 362; the source node of switch Q5 is connected to the input voltage node 151.

Capacitor CRES1 is connected across node 351 and node 352. Capacitor CRES2 is connected across node 361 and node 362.

In one embodiment, series circuit including capacitor CDC and inductor 311 (such as Lzvs) is connected between the node 351 and node 361. Capacitor CDC is optional.

In one embodiment, the capacitor CDC is not present in the circuit. In such an instance, the node 351 is shorted with a circuit trace to node 386. In other words, in one embodiment, the capacitor CDC is replaced with a zero ohm resistor or trace between the node 351 and node 386.

Capacitor Cmid is connected between the ground reference and the input voltage node 151. Capacitor Cout is connected between the output voltage node 152 and the ground reference.

Thus, the multiple switches Q1-Q8 of the switched capacitor converter 131 include: a first pair of switches (such as switch Q3 and Q4) operative to switch between connecting a first node 351 of the first capacitor CRES1 between the output voltage node 152 and the ground reference voltage; a second pair of switches (such as switches Q1 and Q2) operative to switch between connecting a second node 352 of the first capacitor CRES1 between the ground reference voltage and the input voltage node 151; a third pair of switches (such as switch Q8 and switch Q7) operative to switch between connecting a first node 361 of the second capacitor CRES2 between the output voltage node 152 and the ground reference voltage; and a fourth pair of switches (such as switch Q5 and switch Q6) operative to switch between connecting a second node 362 of the second capacitor CRES2 between the input voltage node 151 and the ground reference voltage.

As previously discussed, the power converter 112 (or switched capacitor converter 131) includes a circuit path extending between the first node 351 of the first capacitor CRES1 and the first node 361 of the second capacitor CRES2. The inductor 311 in the series circuit path supports zero voltage switching of the switches in the power converter 112 to convert the intermediate voltage 121 into the output voltage 123.

In one embodiment, the power converter 112 and series circuit path further includes a capacitor CDC. In one embodiment, this third capacitor (CDC) such as a DC bias blocking capacitor. The capacitor CDC is disposed at any suitable location such as in series with the inductor 311 between the first node 351 of the first capacitor CRES1 and the first node 361 of the second capacitor CRES2.

Thus, the second power converter 112 can be configured in any suitable manner. For example, in one embodiment, the second power converter 112 includes: i) a first resonant capacitor CRES1 and a second resonant capacitor CRES2; and ii) an inductor 311 coupling the first resonant capacitor CRES1 and the second resonant capacitor CRES2, the inductor 311 supporting zero voltage switching of switches (Q1-Q8) in the second power converter stage to convert the intermediate voltage 121 into the output voltage 123.

Accordingly, in one embodiment, the power converter 112 includes: a first capacitor CRES1, a second capacitor CRES2, an input voltage node 151 that receives the intermediate voltage 121, an output voltage node 152 that outputs the output voltage 123, and multiple switches Q1-Q8.

FIG. 4 is an example timing diagram illustrating phase control and resonant current according to embodiments herein.

In general, as shown in graph 400, the controller 140 produces the control signal 105-2 to be an inversion of control signal 105-1. A pulse width of each control signal is approximately 48% of the switching period or other suitable pulse width modulation value.

Between time T0 and time T1, between time T4 and T5, etc., (a.k.a., mode A), when the control signal 105-1 (at a logic high) controls the set of switches Q1, Q3, Q6, and Q8, to an ON state (low impedance or short circuit), the control signal 105-2 (logic lo) controls the set of switches Q2, Q4, Q5, and Q7, to an OFF state (very high impedance or open circuit).

Conversely, between time T2 and time T3, between time T6 and T7), etc., (a.k.a., mode B), when the control signal 105-2 (logic high) controls the set of switches Q2, Q4, Q5, and Q7, to an ON state, the control signal 105-1 (logic low) controls the set of switches Q1, Q3, Q6 and Q8, to an OFF state.

Note that the duration between times T1 and time T2, between time T3 and T4, between time T5 and T6, etc., (a.k.a., mode C), the duration between time T3 and time T4, duration between T5 and T6, etc., represents so-called dead times during which each of the switches (Q1-Q8) in the power converter 112 is deactivated to the OFF state.

As further shown, the control signals 105 are cyclical. For example, the settings of control signals 105 for subsequent cycles is the same as those for the cycle between time T0 and time T4. More specifically, in one non-limiting example embodiment, the settings of control signals 105 produced by the controller 140 between time T4 and time T8 is the same as settings of control signals 105 between time T0 and time T4, and so on.

In accordance with further example embodiments, the controller 140 controls the frequency or ON-time duration (i.e. to avoid body diode conduction) of the control signals (period is time between T0 and time T4) can be generated at any suitable frequency.

Additionally, as previously mentioned, the controller 140 controls the pulse duration of the control signals 105 to be around 48% depending on the dead-time duration, although the control signals 105 can be generated at any suitable pulse width modulation value.

As further discussed herein, certain embodiments include adjusting the dead time of each of one or more power converters (such as switched-capacitor converter 112) operating in parallel.

In one embodiment, the design of the multiple stage power converters (power supply 100) is optimized for a communication application with a so-called quarter brick size limitation. In one embodiment, all inductors are realized with planar components for cost and/or size reduction.

In still further example embodiments, an optimization of the power converter 111 (such as buck converter or other suitable entity) for the specific application of an antenna application includes multiple interleaved phases as previously discussed. The switches in the power converter 111 can be any components such as 100V GaN devices with 3 mOhm Rdson. The inductors of each phase are planar inductors with 1.9 uH consisting of a PQI core with N49 ferrite core material and a 4 layer PCB board with 105 um copper thickness and 0.4 mm air-gap. The switching frequency is set to 660 kHz.

In accordance with further example embodiments, the switched-capacitor converter 131 includes two or more interleaved phases as previously discussed. Each switch in the switched-capacitor converter 121 can be realized with two parallel 40V MOSFETs (switches) with 1.3 mOhm RDSon. The resonant capacitors are 27.7 uF, 50V, X7R capacitors and the ZVS inductor is a planar inductor with 2.5 uH. In one embodiment, the switching frequency of the switched-capacitor converter 131 is set to 580 kHz (or other suitable setting) with a dead-time of 100 ns or other suitable value. In one embodiment, the resonant inductors such as inductor 311 are implemented via PCB (Printed Circuit Board) traces or, alternatively, discreet components of other suitable form.

FIG. 4 further illustrates a magnitude of the resonant currents ICRES1 and ICRES2 over each respective cycle. Via the inductor 311, the controller 140 supports zero voltage switching of the respective switches Q1-Q8.

Figure 5:
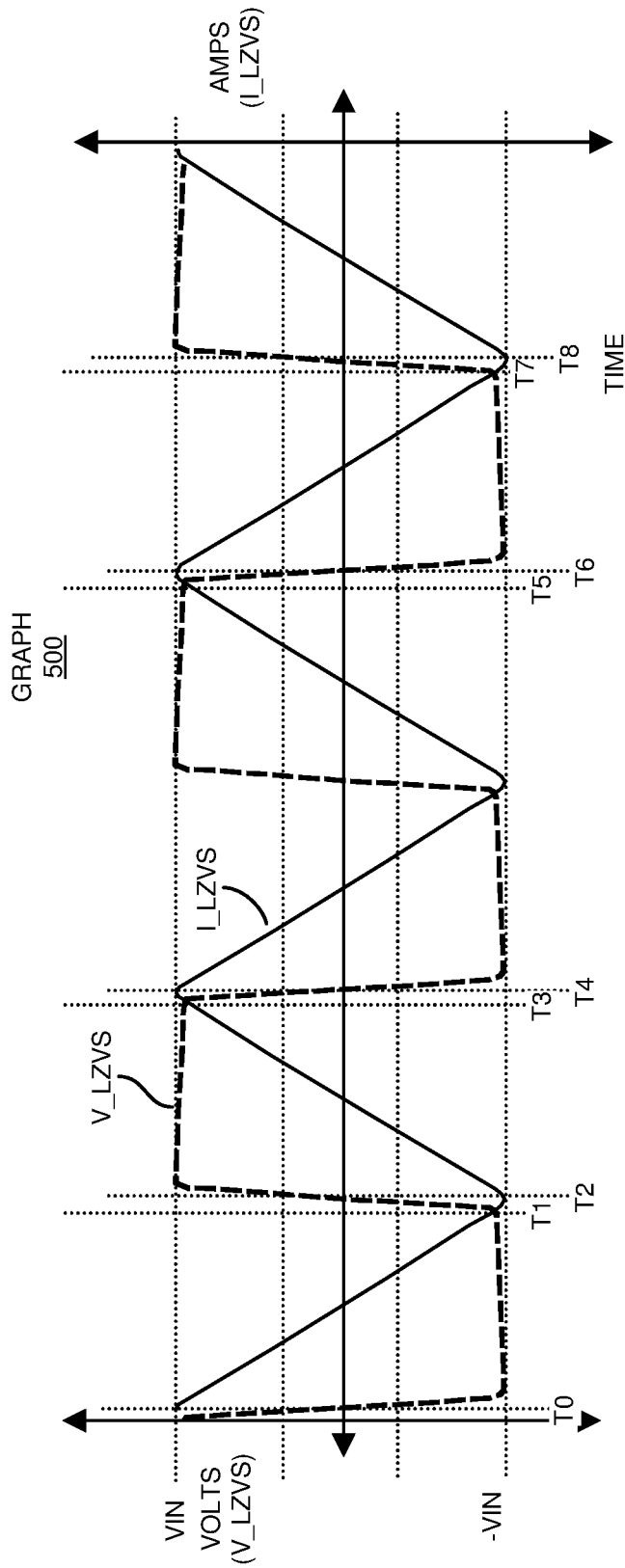
FIG. 5 is an example diagram illustrating zero voltage switching and corresponding inductor current according to embodiments herein.

FIG. 5 is an example diagram illustrating zero voltage switching and corresponding inductor current according to embodiments herein.

I. The stored energy in the Coss of all the switches Q1-Q8 (such as MOSFETs) is as follows:

$$E_{Qn} = \sum_{i=1}^{n} C_{avg\_Qoss_i} \cdot (V_{in\_max} \cdot 2)^2,$$

where n=8 switches

II. The stored energy in the Lzvs inductor 311 is as follows:

$$E_{QLzvs} = 0.5 \cdot L_{zvs} \cdot I_{Lzvs}^2$$

$$E_{QLzvs} >> E_{Qn}$$

In one embodiment, voltage and current conditions for the ZVS inductor 311 (always constant). Voltage and current is changing a little over load 118, due to the load 118 current depending on voltage drop across the switches Q1-Q8 (such as MOSFETs).

Figure 6:
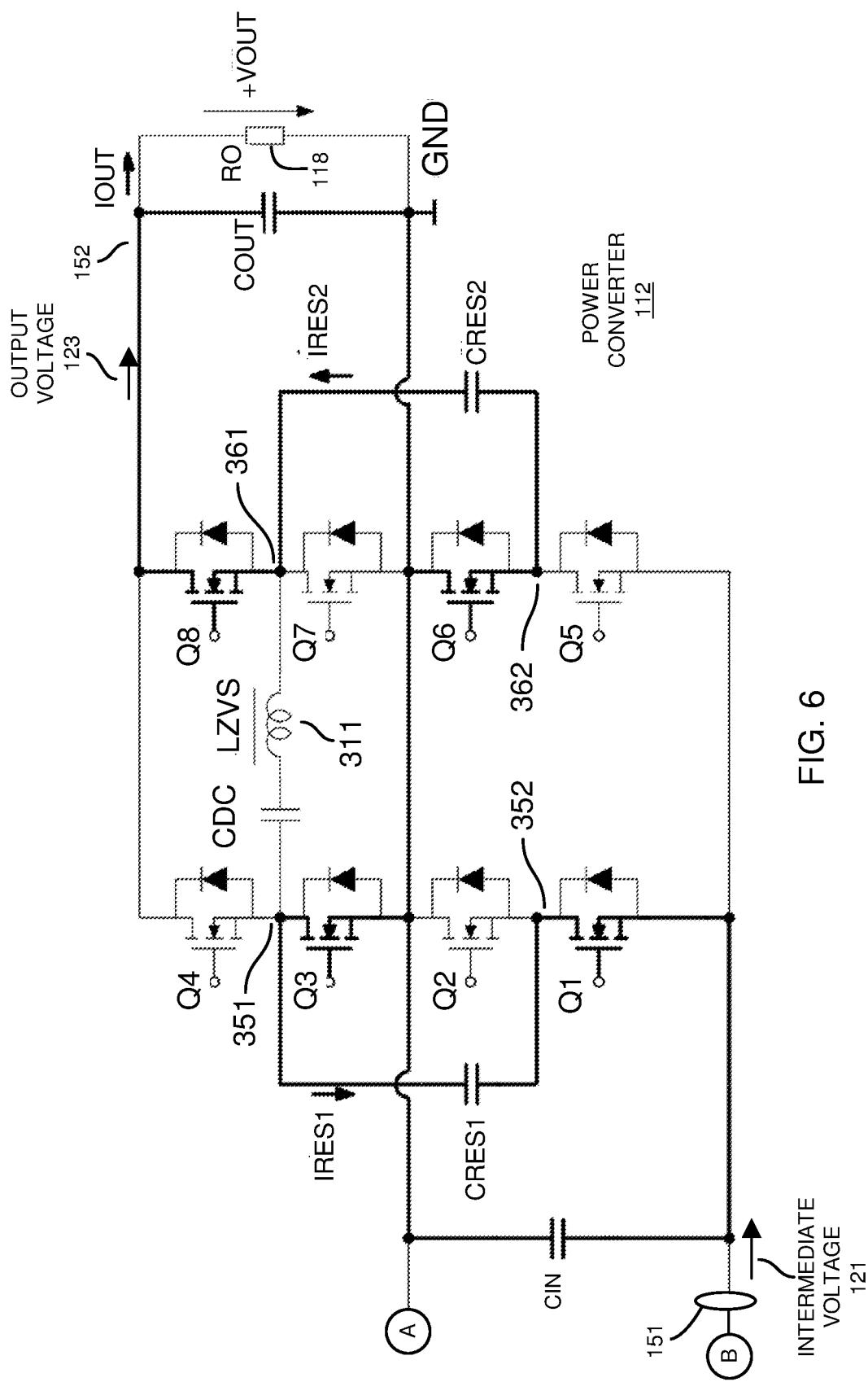
FIG. 6 is an example diagram illustrating operation of the second power converter stage in a first mode (mode A) according to embodiments herein.

FIG. 6 is an example diagram illustrating operation of the second power converter stage in a first mode (mode A) according to embodiments herein.

For mode A, such as between time T0 and time T1, between time T4 and T5, etc., switches Q2, Q4, Q5, and Q7 are turned OFF; switches Q1, Q3, Q6, and Q8 are turned ON. This results in connecting node 351 of capacitor CRES1 to ground and connecting node 352 of the capacitor CRES1 to input voltage node 151 such as receiving intermediate voltage 121. This also results in connecting node 361 of capacitor CRES2 to the output voltage node 152 and connecting node 362 of the capacitor CRES2 to ground.

Figure 7:
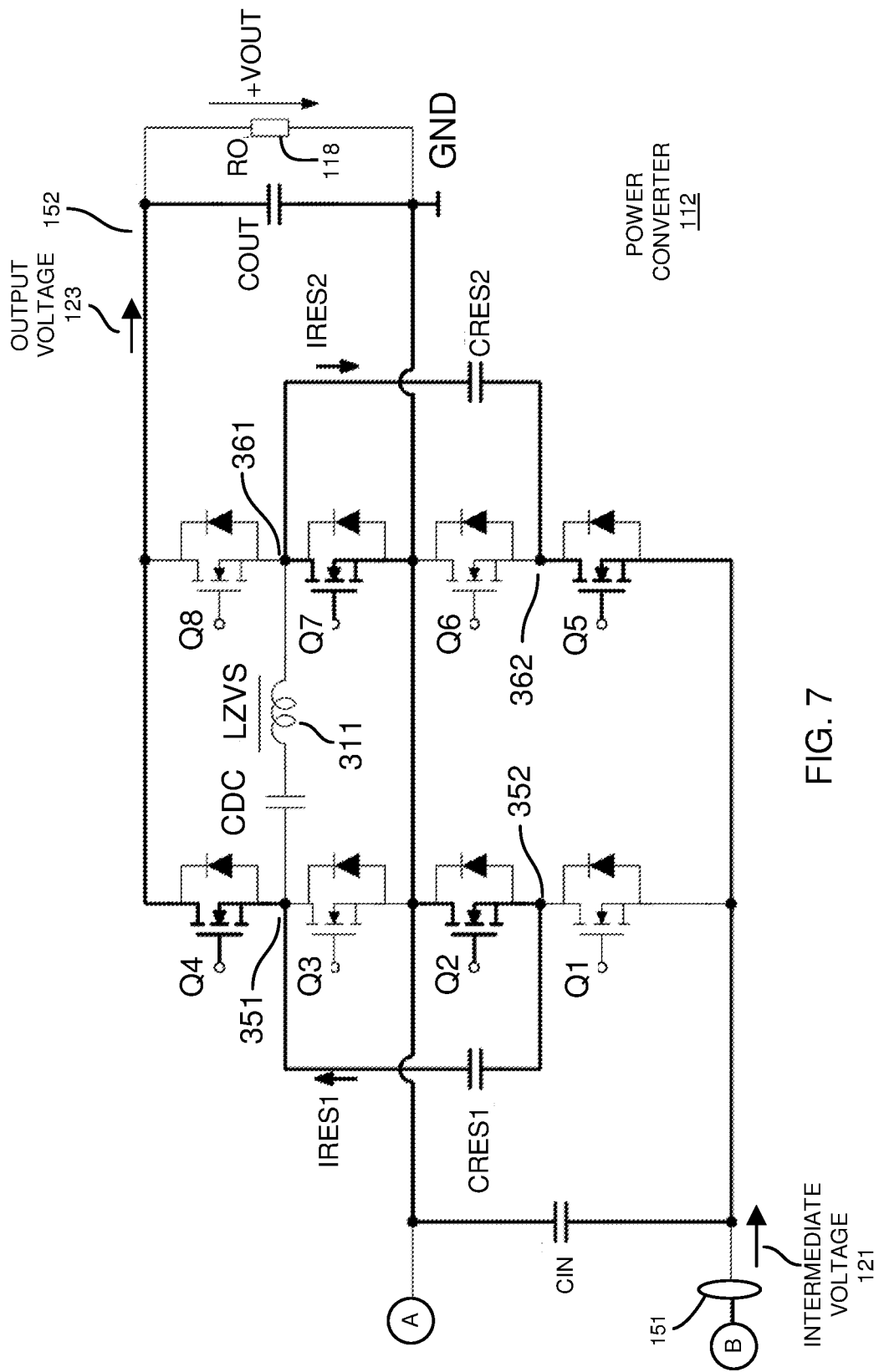
FIG. 7 is an example diagram illustrating operation of the second power converter stage in a second mode (mode B) according to embodiments herein.

FIG. 7 is an example diagram illustrating operation of the second power converter stage in a second mode (mode B) according to embodiments herein.

For mode B, between time T2 and time T3, between time T6 and T7, etc., switches Q2, Q4, Q5, and Q7 are turned ON; switches Q1, Q3, Q6, and Q8 are turned OFF. This results in connecting node 361 of capacitor CRES2 to ground and connecting node 362 of the capacitor CRES2 to the input voltage node 151 such as receiving intermediate voltage 121. This also results in connecting node 351 of capacitor CRES1 to the output voltage node 152 and connecting node 352 of the capacitor CRES1 to ground.

Figure 8:
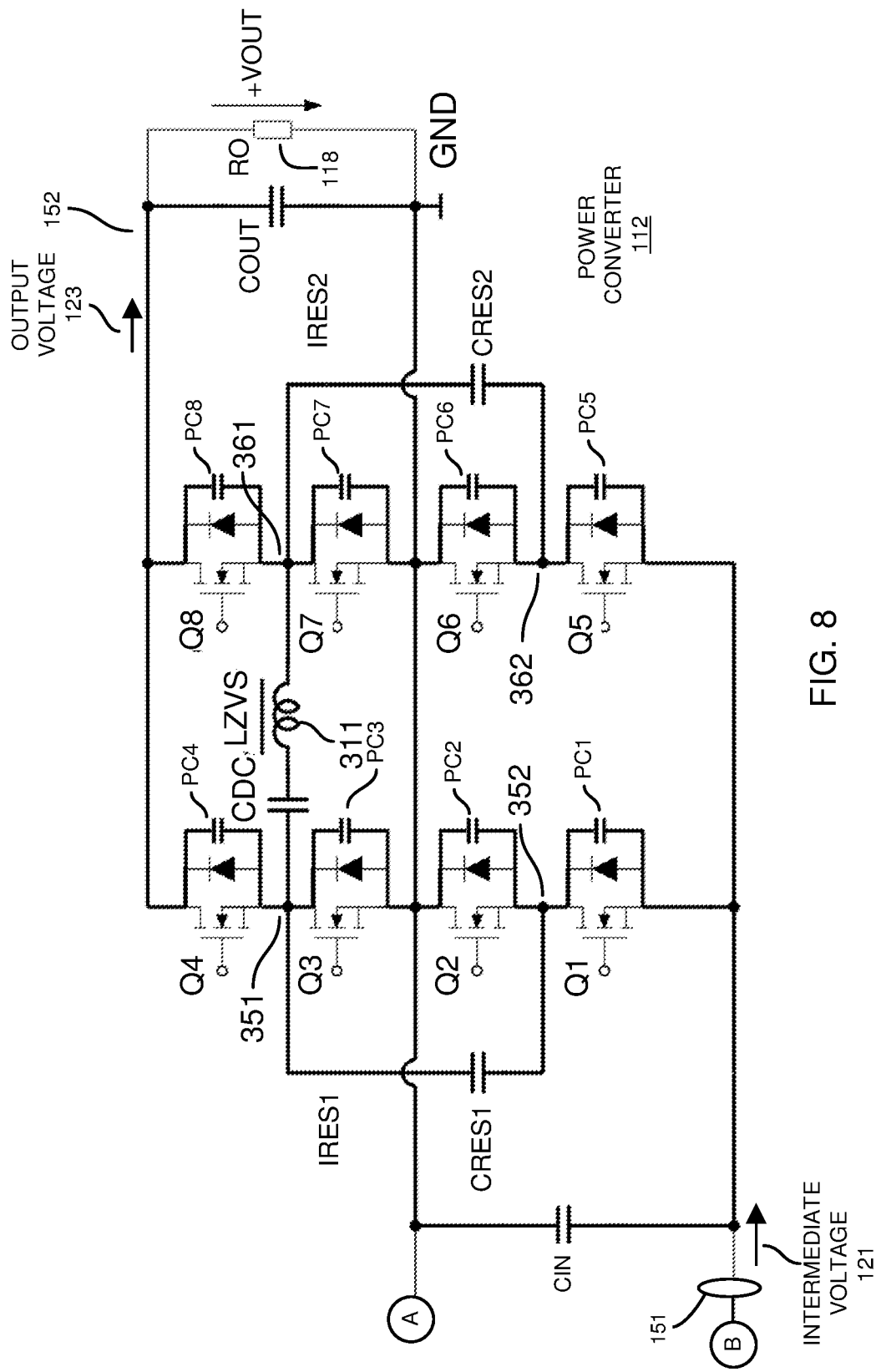
FIG. 8 is an example diagram illustrating operation of the second power converter stage in a third mode (mode C or dead time) according to embodiments herein.

FIG. 8 is an example diagram illustrating operation of the second power converter stage in a third mode (mode C or dead time) according to embodiments herein.

In this example embodiment, the switch Q1 has a corresponding Coss of PC1; the switch Q2 has a corresponding Coss of PC2; the switch Q3 has a corresponding Coss of PC3; the switch Q4 has a corresponding Coss of PC4; the switch Q5 has a corresponding Coss of PC5; the switch Q6 has a corresponding Coss of PC6; the switch Q7 has corresponding Coss of PC7; and so on.

In one embodiment, parameter Coss (or PCx value such as one of PC1, PC2, PC3, etc.) of a respective switch represents the output capacitance of the respective switch, which in one embodiment is obtained by adding the drain-source capacitance Cds and the gate-drain capacitance Cgs, and is the total capacitance on the output side of a respective switch.

For mode C, between time T1 and time T2, between time T3 and T4, etc., switches Q2, Q4, Q5, and Q7 are turned OFF; switches Q1, Q3, Q6, and Q8 are turned OFF. This results in the inductance current provided by the inductor 311 charging/discharging parasitic capacitances PC1, PC2, PC3, PC4, PC5, PC6, PC7, and PC8 (such as Coss) of the switches Q1-Q8, and corresponding zero voltage switching of such switches Q1-Q8. During the dead time, capacitors CRES1 and CRES2 may be seen as constant voltage sources.

Figure 9:
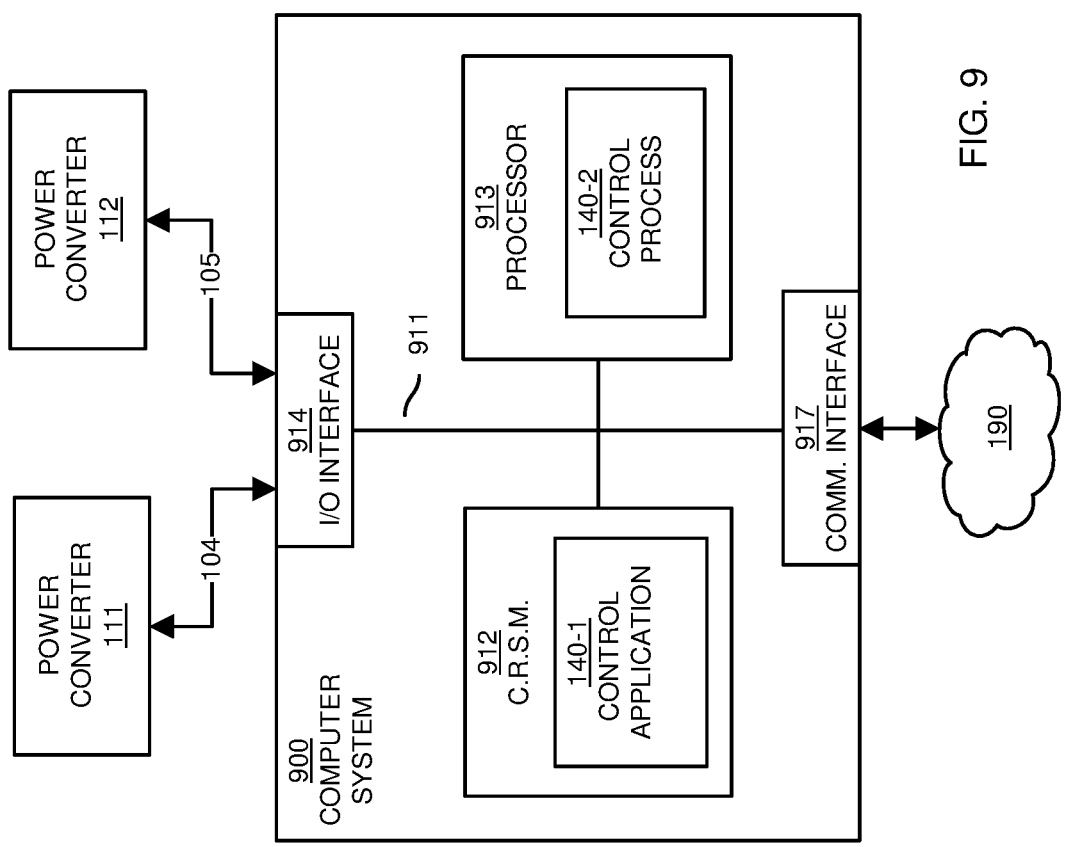
FIG. 9 is an example diagram illustrating computer processor hardware and related software instructions that execute methods according to embodiments herein.

In summary:
- the power converter 111 (such as a buck stage) is exposed to just Vin_max voltage stress
- the power converter 111 provides flat efficiency over the full input voltage range.
- if desired, each of the switches in the power converter 111 can be 3 m Ohm 100V GaN devices or other suitable switch device
- the power converter 112 ZSC (Zero voltage switching Switched capacitor converter) shows benefits due to the constant value of intermediate voltage 121.
- there is no indication of resonant frequency change due to different capacitor values
- power converter 111 can be configured to implement soft start
- Lzvs inductor 311 is exposed to lower voltage levels, resulting lower constant core losses
- resonant inductor can be implemented with parasitic, resulting in the ability to increase switching frequency fsw
- switches can be implemented as 40V MOSFET class devices or other suitable components FIG. 9 is an example block diagram of a computer device for implementing any of the operations as discussed herein according to embodiments herein.

As shown, computer system 900 (such as implemented by any of one or more resources such as controller 140, power converter 111, power converter 112, etc.) of the present example includes an interconnect 911 that couples computer readable storage media 912 such as a non-transitory type of media (or hardware storage media) in which digital information can be stored and retrieved, a processor 913 (e.g., computer processor hardware such as one or more processor devices), I/O interface 914 (e.g., to output control signals to the power converter phases, monitor current, etc.), and a communications interface 917.

I/O interface 914 provides connectivity to any suitable circuitry such as power supply 100 and corresponding power converter phases 111, 112, etc.

Computer readable storage medium 912 can be any hardware storage resource or device such as memory, optical storage, hard drive, floppy disk, etc. In one embodiment, the computer readable storage medium 912 stores instructions and/or data used by the controller application 140-1 to perform any of the operations as described herein.

Further in this example embodiment, communications interface 917 enables the computer system 900 and processor 913 to communicate over a resource such as network 190 to retrieve information from remote sources and communicate with other computers.

As shown, computer readable storage media 912 (such as computer-readable storage hardware) is encoded with controller application 140-1 (e.g., software, firmware, etc.) executed by processor 913. Controller application 140-1 can be configured to include instructions to implement any of the operations as discussed herein.

During operation of one embodiment, processor 913 accesses computer readable storage media 912 via the use of interconnect 911 in order to launch, run, execute, interpret or otherwise perform the instructions in controller application 140-1 stored on computer readable storage medium 912.

Execution of the controller application 140-1 produces processing functionality such as controller process 140-2 in processor 913. In other words, the controller process 140-2 associated with processor 913 represents one or more aspects of executing controller application 140-1 within or upon the processor 913 in the computer system 900.

In accordance with different embodiments, note that computer system 900 can be a micro-controller device, logic, hardware processor, hybrid analog/digital circuitry, etc., configured to control a power supply and perform any of the operations as described herein.

Functionality supported by the different resources will now be discussed via flowchart in FIG. 10. Note that the steps in the flowcharts below can be executed in any suitable order.

Figure 10:
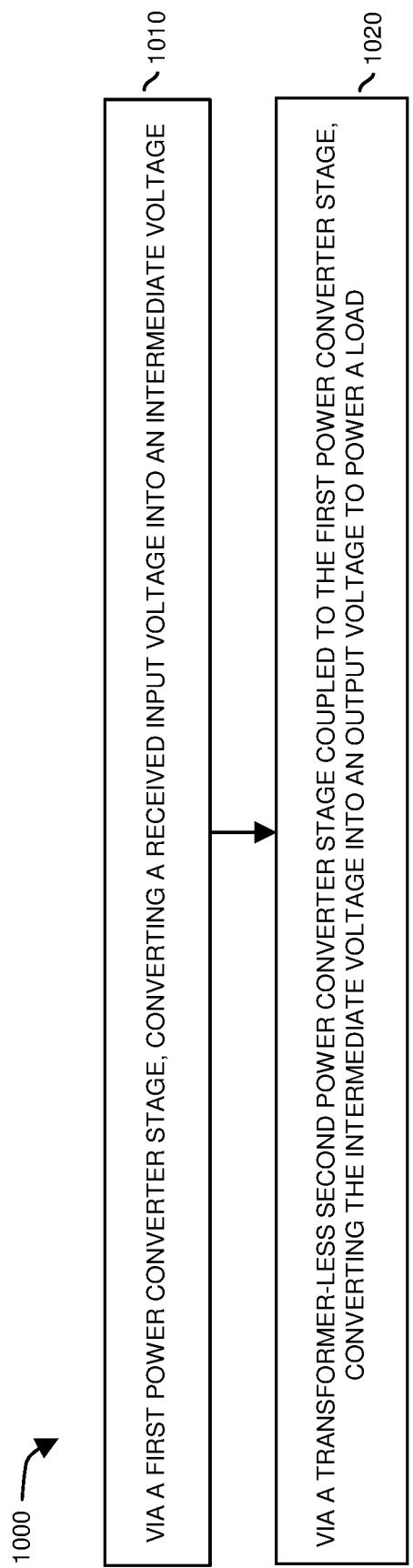
FIG. 10 is an example diagram illustrating a method according to embodiments herein.

FIG. 10 is an example diagram illustrating a method of controlling a power converter according to embodiments herein.

In processing operation 1010, a first power converter 111 converts a received input voltage 120 into an intermediate voltage 121.

In processing operation 1020, a transformer-less second power converter 112 coupled to the first power converter stage 111 converts the intermediate voltage 121 into an output voltage 123 to power a load 118.

Figure 11:
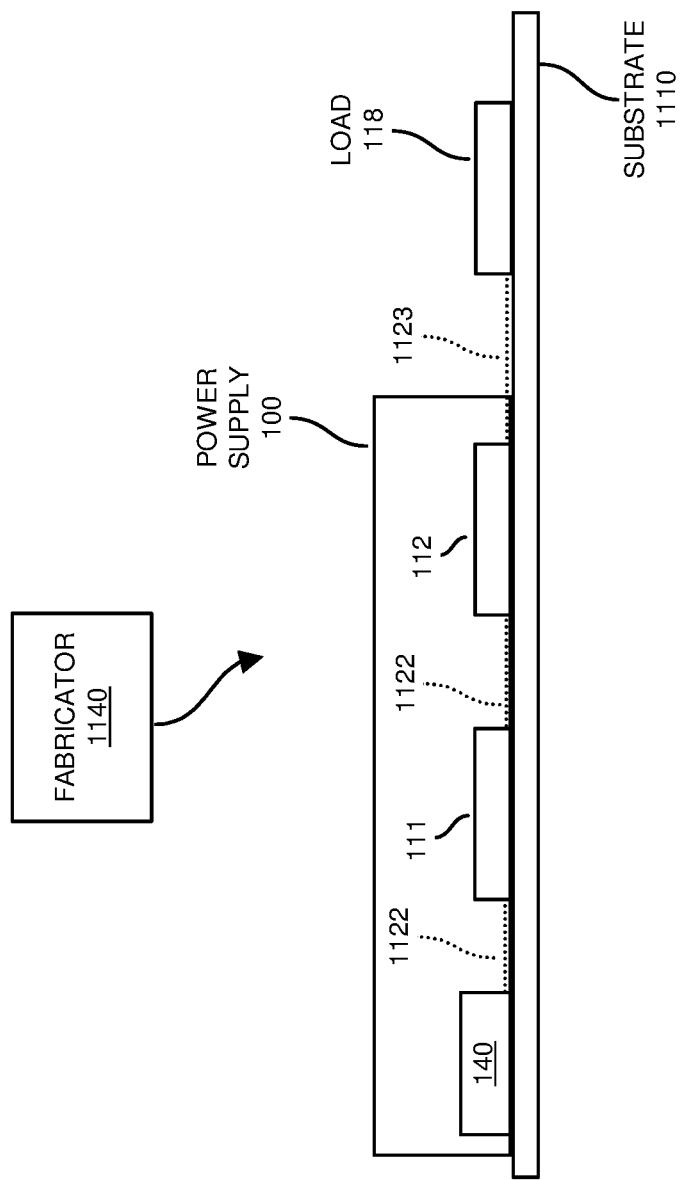
FIG. 11 is an example diagram illustrating assembly of a circuit according to embodiments herein.

FIG. 11 is an example diagram illustrating assembly of a power supply and multiple interconnected power converter phases on a circuit board according to embodiments herein.

In this example embodiment, assembler 1140 receives a substrate 1110 and corresponding components of power supply 100 to fabricate controller 140, power converter 111, power converter 112, etc. The assembler 1140 affixes (couples) the controller 140 and other components such as associated with the power converter phases 111 and 112, corresponding switches, etc., to the substrate 1110.

Via respective circuit paths 1122 as described herein, the assembler 1140 provides connectivity between the controller 140, power converter 111 (a.k.a., first power converter stage), and power converter 112 (a.k.a., second power converter stage), controller 140, etc.

Note that components such as the controller 140, power converter 111, power converter 112, load 118, and corresponding components can be affixed or coupled to the substrate 1110 in any suitable manner. For example, one or more of the components in power supply 100 can be soldered to the substrate 1110, inserted into respective sockets disposed on the substrate 1110, etc.

Note further that the substrate 1110 is optional. Any of one or more circuit paths or connectivity as shown in the drawings and as described herein can be disposed in cables or other suitable medium.

In one nonlimiting example embodiment, the load 118 is disposed on its own substrate independent of substrate 1110; the substrate of the load 118 is directly or indirectly connected to the substrate 1110 via connectivity 1123 such as one or more of wires, cables, links, etc. The controller 140 or any portion of the power supply 100 and corresponding power converter phases can be disposed on a standalone smaller board plugged into a socket of the substrate 1110 as well.

Via one or more circuit paths 1123 (such as one or more traces, cables, connectors, wires, conductors, electrically conductive paths, etc.), the assembler 1140 couples the power supply 100 and corresponding power converter phases to the load 118. In one embodiment, the circuit path 1123 conveys the output voltage 123 and corresponding current generated by the power converter phases to the load 118.

Accordingly, embodiments herein include a system comprising: a substrate 1110 (such as a circuit board, standalone board, mother board, standalone board destined to be coupled to a mother board, host, etc.); a power supply system 100 including corresponding components as described herein; and a load 118 (such as a motor, winding, etc.).

Note that the load 118 can be any suitable circuit or hardware such as one or more CPUs (Central Processing Units), GPUs (Graphics Processing Unit) and ASICs (Application Specific Integrated Circuits such those including one or more Artificial Intelligence Accelerators), which can be located on the substrate 1110 or disposed at a remote location.

Note again that techniques herein are well suited for use in circuit applications such as those that that generate an output voltage to power a load. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:
  a first power converter stage operative to receive an input voltage and convert the input voltage into an intermediate voltage;
  a second power converter stage coupled to the first power converter stage, the second power converter stage operative to receive the intermediate voltage and convert the intermediate voltage into an output voltage to power a load; and
  the second power converter stage being a transformer-less switched-capacitor converter;
  wherein the second power converter stage includes:
    a reference node to which the output voltage is referenced, the reference node set to a reference voltage;
    a first capacitor;
    a second capacitor;
    a first pair of switches operative to switch between connecting a first node of the first capacitor and a second node of the first capacitor to the reference node; and
    a second pair of switches operative to switch between connecting a first node of the second capacitor and a second node of the second capacitor to the reference node.

2. The apparatus as in claim 1, wherein the intermediate voltage produced by the first power converter stage is a negative voltage; and
  wherein the second power converter stage is a voltage inverter operative to convert the intermediate voltage into the output voltage, the output voltage being a positive voltage.

3. The apparatus as in claim 2, wherein a magnitude of the output voltage is substantially equal to a magnitude of the intermediate voltage.

4. The apparatus as in claim 1 further comprising:
  a controller operative to: i) receive an output voltage feedback signal derived from the output voltage, and ii) regulate generation of the intermediate voltage based on a magnitude of the output voltage feedback signal.

5. The apparatus as in claim 1, wherein the second power converter stage is operative to provide unregulated conversion of the intermediate voltage into the output voltage.

6. The apparatus as in claim 1 further comprising:
  a controller operative to: i) receive an intermediate voltage feedback signal derived from the intermediate voltage, and ii) regulate generation of the intermediate voltage based on the intermediate voltage feedback signal.

7. The apparatus as in claim 1 further comprising:
  a controller operative to: i) vary a switching frequency of operating switches in the first power converter stage to convert the input voltage into the intermediate voltage, and ii) set a switching frequency of the second power converter stage to a predetermined switching frequency value.

8. The apparatus as in claim 1, wherein the first capacitor is a first resonant capacitor and the second capacitor is a second resonant capacitor, the second power converter stage including:
  an inductor coupling the first resonant capacitor and the second resonant capacitor, energy stored in the inductor supporting zero voltage switching of switches in the second power converter stage to convert the intermediate voltage into the output voltage.

9. A system comprising:
  a circuit substrate; and
  the apparatus of claim 1, the apparatus coupled to the circuit substrate.

10. The apparatus as in claim 1 further comprising:
  a controller operative to control switching of the first pair of switches and the second pair of switches in the second power converter stage at a resonant frequency associated with the second power converter stage.

11. The apparatus as in claim 1, wherein the first capacitor is a first resonant capacitor and the second resonant capacitor is a second capacitor, the second power converter stage including:
  an inductor coupling the first resonant capacitor and the second resonant capacitor, a resonant frequency of the second power converter stage defined by the first resonant capacitor, the second resonant capacitor, and the inductor.

12. The apparatus as in claim 1, further comprising:
  a controller operative to control the first pair or switches and the second pair switches by switching between:
    i) a first mode in which the first node of the first capacitor is electrically connected to the reference node, the second node of the first capacitor is electrically disconnected from the reference node, the first node of the second capacitor is electrically disconnected from the reference node, and the second node of the second capacitor is electrically connected to the reference node; and
    ii) a second mode in which the first node of the first capacitor is electrically disconnected from the reference node, the second node of the first capacitor is electrically connected to the reference node, the first node of the second capacitor is electrically connected to the reference node, and the second node of the second capacitor is electrically disconnected from the reference node.

13. The apparatus as in claim 12, wherein the intermediate voltage is a negative voltage with respect to the reference node and the output voltage is a positive voltage with respect to the reference node.

14. The apparatus as in claim 1,
wherein the second power converter stage includes a circuit path extending between the first capacitor and the second capacitor, the circuit path including an inductor storing energy operative to support zero voltage switching of switches in the second power converter stage to convert the intermediate voltage into the output voltage.

15. The apparatus as in claim 1, wherein the second power converter stage includes:
an intermediate voltage node operative to receive the intermediate voltage;
an output voltage node operative to output the output voltage; and
the intermediate voltage and the output voltage being referenced with respect to the reference node.

16. The apparatus as in claim 1, An apparatus comprising:
a first power converter stage operative to receive an input voltage and convert the input voltage into an intermediate voltage;
a second power converter stage coupled to the first power converter stage, the second power converter stage operative to receive the intermediate voltage and convert the intermediate voltage into an output voltage to power a load; and
the second power converter stage being a transformer-less switched-capacitor converter;
wherein the second power converter stage includes:
a first capacitor;
a second capacitor;
an input node operative to receive the intermediate voltage;
an output node operative to output the output voltage; multiple switches including:
a first pair of switches operative to switch between connecting a first node of the first capacitor between the output node and a ground reference voltage;
a second pair of switches operative to switch between connecting a second node of the first capacitor between the ground reference voltage and the input node;
a third pair of switches operative to switch between connecting a first node of the second capacitor between the output node and the ground reference voltage; and
a fourth pair of switches operative to switch between connecting a second node of the second capacitor between the ground reference voltage and the input node.

17. The apparatus as in claim 16, wherein the second power converter stage includes a circuit path extending between the first node of the first capacitor and the first node of the second capacitor, energy stored in the inductor operative to support zero voltage switching of the switches in the second power converter stage to convert the intermediate voltage into the output voltage.

18. The apparatus as in claim 17, wherein the second power converter stage includes a third capacitor, the third capacitor being a DC bias voltage blocking capacitor; and
wherein the third capacitor is disposed in series with the inductor between the first node of the first capacitor and the first node of the second capacitor.

19. The apparatus as in claim 16, wherein the first pair of switches and the second pair of switches are disposed in series between the output voltage node and the input voltage node; and
wherein the third pair of switches and the fourth pair switches are disposed in series between the output voltage node and the input voltage node.

20. A method comprising:
via a first power converter stage, converting a received input voltage into an intermediate voltage; and
via a transformer-less second power converter stage coupled to the first power converter stage, converting the intermediate voltage into an output voltage to power a load, the transformer-less second power converter stage being a switched-capacitor converter;
wherein the second power converter stage includes:
a first capacitor;
a second capacitor;
an input node operative to receive the intermediate voltage;
an output node operative to output the output voltage, the method further comprising:
via a first pair of switches, switching between connecting a first node of the first capacitor between the output node and a ground reference voltage;
via a second pair of switches, switching between connecting a second node of the first capacitor between the ground reference voltage and the input node;
via a third pair of switches, switching between connecting a first node of the second capacitor between the output node and the ground reference voltage; and
via a fourth pair of switches, switching between connecting a second node of the second capacitor between the ground reference voltage and the input node.

21. The method as in claim 20, wherein the output voltage is opposite in polarity with respect to the intermediate voltage.

22. The method as in claim 21, wherein a magnitude of the output voltage is substantially equal to a magnitude of the intermediate voltage.

23. The method as in claim 20 further comprising:
receiving an output voltage feedback signal derived from the output voltage; and
regulating generation of the intermediate voltage based on a magnitude of the output voltage feedback signal.

24. The method as in claim 20 further comprising:
via the second power converter stage, providing unregulated conversion of the intermediate voltage into the output voltage.

25. The method as in claim 20 further comprising:
receiving an intermediate voltage feedback signal derived from the intermediate voltage; and
regulating generation of the intermediate voltage based on the intermediate voltage feedback signal.

26. The method as in claim 20 further comprising:
varying a switching frequency of operating switches in the first power converter stage to convert the input voltage into the intermediate voltage; and
setting a switching frequency of the second power converter stage to a predetermined switching frequency value.

27. The method as in claim 20, wherein the second power converter stage includes a first resonant capacitor and a second resonant capacitor, the method further comprising:

via an inductor of the second power converter stage, coupling the first resonant capacitor and the second resonant capacitor, energy in the inductor providing zero voltage switching of switches in the second power converter stage during conversion of the intermediate voltage into the output voltage.

28. The method as in claim 20, wherein the second power converter stage includes a circuit path extending between the first node of the first capacitor and the first node of the second capacitor, the method further comprising:
via energy stored in the inductor, supporting zero voltage switching of the switches in the second power converter stage to convert the intermediate voltage into the output voltage.

29. The method as in claim 28, wherein the second power converter stage includes a third capacitor, the third capacitor being a zero voltage switching capacitor; and
wherein the third capacitor is disposed in series with the inductor between the first node of the first capacitor and the first node of the second capacitor.

30. The method as in claim 20, wherein the first pair of switches and the second pair of switches are disposed in series between the output voltage node and the input voltage node; and
wherein the third pair of switches and the fourth pair switches are disposed in series between the output voltage node and the input voltage node.

31. A controller operative to implement the method as in claim 13 via control of respective switches in the first power converter stage and the second power converter stage.

32. An apparatus comprising:
a first power converter stage operative to receive an input voltage and convert the input voltage into an intermediate voltage;
a second power converter stage coupled to the first power converter stage, the second power converter stage operative to receive the intermediate voltage and convert the intermediate voltage into an output voltage to power a load; and
the second power converter stage being a transformer-less switched-capacitor converter;
wherein the second power converter stage includes a first capacitor and a second capacitor;
wherein the second power converter stage includes a circuit path extending between the first capacitor and the second capacitor, the circuit path including an inductor storing energy operative to support zero voltage switching of switches in the second power converter stage to convert the intermediate voltage into the output voltage;
wherein the circuit path includes a third capacitor in series with the inductor, the third capacitor being a DC bias voltage blocking capacitor.

33. An apparatus comprising:
a first power converter stage operative to receive an input voltage and convert the input voltage into an intermediate voltage;
a second power converter stage coupled to the first power converter stage, the second power converter stage operative to receive the intermediate voltage and convert the intermediate voltage into an output voltage to power a load; and
the second power converter stage being a transformer-less switched-capacitor converter;
wherein the second power converter stage includes:
an intermediate voltage node operative to receive the intermediate voltage;
an output voltage node operative to output the output voltage; and
a reference node to which the intermediate voltage and the output voltage are referenced; and
wherein the second power converter stage further includes:
a first sequence of switches extending in series between the intermediate voltage node and the output voltage node;
a second sequence of switches extending in series between the intermediate voltage node of the output voltage node; and
a controller operable to control operation of the first sequence of switches and the second sequence of switches to convert the intermediate voltage into the output voltage.

34. The apparatus as in claim 33, wherein the intermediate voltage is a negative voltage value with respect to the reference node and the output voltage is a positive voltage value with respect to the reference node;
wherein a node of the first sequence of switches is electrically connected to the reference node; and
wherein a node of the second sequence of switches is electrically connected to the reference node.

35. The apparatus as in claim 33 further comprising:
a first capacitor connected in a parallel with a less-than-all portion of the switches in the first sequence; and
a second capacitor connected in a parallel with a less-than-all of the switches in the second sequence.

* * * * *

UNITED STATES PATENT AND TRADEMARK OFFICE
CERTIFICATE OF CORRECTION

| | |
|---|---|
| PATENT NO. | : 11,532,986 B2 |
| APPLICATION NO. | : 17/070273 |
| DATED | : December 20, 2022 |
| INVENTOR(S) | : Christian Rainer and Matthias J. Kasper |

It is certified that error appears in the above-identified patent and that said Letters Patent is hereby corrected as shown below:

In the Claims

Claim 16, Line 1, delete "The apparatus as in claim 1,"

Signed and Sealed this
Seventh Day of March, 2023

Katherine Kelly Vidal
*Director of the United States Patent and Trademark Office*